United States Patent [19]
Allen et al.

[11] Patent Number: 5,893,582
[45] Date of Patent: Apr. 13, 1999

[54] AIRBAG DEPLOYMENT CONTROL SYSTEM

[75] Inventors: Gary S. Allen; Said Shafik Nakhla, both of Lakeland, Fla.

[73] Assignee: Breed Automotive Technology, Inc., Lakeland, Fla.

[21] Appl. No.: 08/804,749

[22] Filed: Feb. 21, 1997

[51] Int. Cl.$^6$ .................................................. B60R 21/26
[52] U.S. Cl. ............................... 280/735; 280/730.1
[58] Field of Search ........................ 280/735, 730.1, 280/734

[56] References Cited

U.S. PATENT DOCUMENTS

| | | | |
|---|---|---|---|
| 4,625,329 | 11/1986 | Ishikawa et al. | 382/1 |
| 4,811,226 | 3/1989 | Shinohara | 364/424.05 |
| 5,000,505 | 3/1991 | Kawashita et al. | 296/65.1 |
| 5,074,583 | 12/1991 | Fujita et al. | 280/735 |
| 5,398,185 | 3/1995 | Omura | 280/735 |
| 5,413,378 | 5/1995 | Steffens, Jr. et al. | 280/735 |
| 5,482,314 | 1/1996 | Corrado et al. | 280/735 |
| 5,707,110 | 1/1998 | Campbell et al. | 297/344.1 |

*Primary Examiner*—Kenneth R. Rice
*Attorney, Agent, or Firm*—L. R. Drayer

[57] ABSTRACT

An airbag deployment control system for use in a vehicle to selectively control the deployment of airbag(s) in a driver side and/or passenger side airbag protection system comprising a switch or sensor assembly to detect the position of the driver seat and/or passenger seat within the front seat compartment of the vehicle and a control means to receive signals from the switch or sensor assembly and to activate, deactivate or modify the deployment of the airbag(s) depending upon the position of the driver seat and/or front passenger seat relative to the dashboard of the vehicle.

16 Claims, 9 Drawing Sheets

AIRBAG DEPLOYMENT CONTROL SYSTEM

BACKGROUND OF THE INVENTION

1. Field of the invention

An airbag deployment control system to detect the position of a driver seat and a passenger seat within the front seat compartment of a vehicle and to selectively control the deployment of the driver side and the passenger side airbags depending upon the position of the seats relative to the dashboard of the vehicle.

2. Description of the Prior Art

Injuries in motor vehicle accidents, especially at high speeds, have been substantially reduced or eliminated by the use of occupant restraint systems. The term occupant includes the driver of a vehicle as well as passengers. Such systems generally include an inflatable airbag normally stored in the steering wheel or dashboard of a vehicle. When the motor vehicle is subjected to a sudden predetermined deceleration, the airbag(s) is/are inflated and deployed automatically in a position to cushion the occupants, restrain their movement and prevent contact with the windshield, steering wheel, instrument panel, dashboard or side door(s).

Unfortunately, problems associated with the deployment of airbags have caused serious concerns. More specifically, the rapid speeds in which airbags must be deployed to cushion the occupants of vehicle s during frontal impact collisions may cause severe neck and/or chest injuries to occupants who are seated in close proximity to the steering wheel column or passenger side dashboard and consequently the airbag deployment region.

The prior art has not directly addressed the problems associated with the relative positions of the seats during the rapid deployment of airbags.

U.S. Pat. No. 5,482,314 teaches a system for sensing the presence, position and profile of occupants in a passenger seat of a vehicle, as well as for sensing the presence of a rear-facing child seat therein, for use in enabling or disabling a related airbag activator. The sensor system employs sensor-fusion, a process of combining information provided by two or more sensors, each of which "sees" the world in a unique sense. The occupancy sensor samples two detectable properties, a first being a thermal signature and associated motion, and a second is acoustically measured distance and the associated motion. Infrared sensor imputs and an ultrasonic sensor imput are combined in a microprocessor circuit by means of a sensor fusion algorithm to produce an output signal to the airbag controller. The output signal results from preselected confidence weighing for feature parameters generated by the two sensors and upon a fusion process which ultimately makes a decision. The sensor fusion matrix processes the sensor outputs in a decision making operation which includes weighing inputs to guarantee reliability. All sensor outputs, along with calibration data, initial conditions and historical reference data are considered in the process of making a decision of whether or not to deploy the passenger side airbag in a collision.

U.S. Pat. No. 5,000,505 teaches a rotary device for front seats of a motor vehicle which enables both a driver seat and a front passenger seat to be rotatably capable of taking an ordinary forwardly facing position and a rearwardly facing position. The device includes a first detection switch provided in the driver seat for electrically detecting the position of the driver seat, a second detection switch provided in the passenger seat for electrically detecting the position of the passenger seat, a first rotation control provided in the driver seat for preventing or permitting the operation of a rotation release lever of the driver seat, and a second rotation control provided in the passenger seat for preventing or permitting the operation of the other rotation release lever of the passenger seat. A control system electrically controls the first and the second rotation controls by receiving signals from the first and second detection switches so as to prevent a condition such that the driver seat is in the forwardly facing position but the passenger seat is in the rearwardly facing position.

U.S. Pat. No. 4,811,226 teaches an automatic angle adjusting apparatus for optimally adjusting vehicle equipment to a driver such as a fender mirror, an inner mirror, blowing ports of an air conditioner, a speaker and a meter. Amounts of adjustment of vehicle seat parts are detected by amounts of adjustment detectors and the optimum angles of the vehicle equipments, a height of the driver or an eye position of the driver are calculated based on the detection signals to automatically adjust the vehicle equipments to the optimum angular position. When the height or the eye position of the driver is calculated, the optimum angles are further calculated based on the calculated height or eye position.

U.S. Pat. No. 4,625,329 teaches an image analyzer for analyzing the position of a vehicle driver in a three-dimensional coordinate system. The analyzer comprises a light emitting element for emitting an infrared light on the driver's face portion and an image detector arranged to receive reflected infrared light to generate an optical image of the driver's face portion. A microcomputer includes a memory for storing an electronic image corresponding to the optical image and processes the stored image to determine the position of a facial feature, such as an eye, in a three dimensional coordinate system. Position indicating data is utilized for controlling the-angular position of a rearview mirror, the angular position of a steering wheel, the angular and height positions of a head rest, the direction of air directed from an air conditioner, and the position of data to be displayed on a display means.

SUMMARY

The present invention relates to an airbag deployment control system for use in a vehicle including means to detect the position of the driver's seat relative to the driver's side self restraint airbag system and means to generate a control signal to either permit or prevent deployment of the driver's side airbag during a collision when the distance between the driver's backrest and the driver's side self restraint airbag system is less than a predetermined distance.

The driver's seat is slidably mounted on a pair of substantially parallel guide tracks by a corresponding pair of substantially parallel support rails attached to the driver's seat such that the driver's seat is adjustable relative to the driver's side self restraint airbag system to accommodate drivers of different statures.

The airbag deployment control system comprises a switch or sensor means operatively coupled to the driver's side self restraint airbag system to detect the position of the driver's seat relative to the driver's side self restraint airbag system and to generate a seat position indicator signal when the distance therebetween is equal to or greater than a predetermined distance to permit deployment of the driver's side airbag during a collision of the vehicle.

The switch or sensor means comprises a first switch or sensor element operatively coupled to at least one of the guide tracks and a second switch or sensor element attached to the corresponding support rail such that as the driver's seat is positioned on the guide tracks the second switch or sensor element in operative relationship relative to the first switch or sensor element, the switch or sensor means generates a seat position indicator signal fed to the control means when the distance between the driver's side self restraint airbag system and the driver's backrest is equal to or greater than the predetermined distance.

The control means comprises circuitry including means to receive the seat position indicator signal generated by the switch or sensor means when the distance between the driver's side self restraint airbag system and the driver's backrest is equal to or greater than the predetermined distance and to generate a control enabling signal fed to the driver's side self restraint airbag system to permit deployment of the driver's side airbag as described more fully hereinafter.

The front passenger's side may be similarly equipped with an airbag deployment control system to permit deployment of a front passenger's side airbag.

Alternatively, the airbag deployment control system may be configured for use with a dual inflator.

When installed, the driver's side airbag self restraint system is operatively coupled to the airbag deployment control system and an accelerometer.

When the vehicle is involved in a collision and the accelerometer senses a deceleration greater than a predetermined threshold level, the accelerometer sends an airbag actuation signal to the driver's side airbag restraint system.

Based upon the position of the driver's seat along the guide rails, the driver's side airbag will deploy, partially deploy or not deploy depending upon whether or not the self restraint system airbag includes a single inflator or dual inflator.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
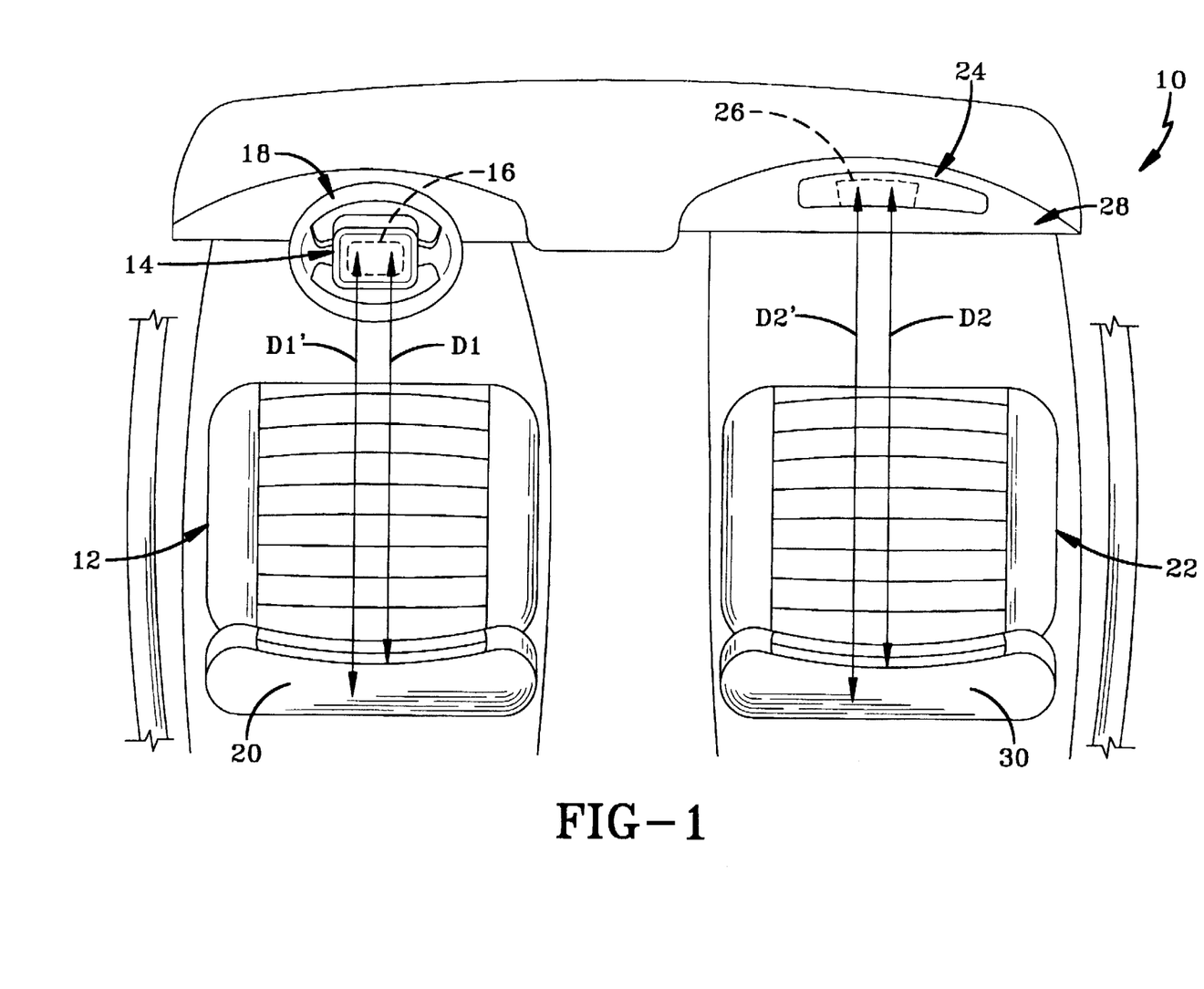
FIG. 1 is a top view of the front seat compartment of a vehicle.

Recent experience has demonstrated that in certain situations occupants of vehicles both drivers and passengers have suffered serious injury and even death as a result of bodily impact or collision with deployed airbags during accidents. The present invention relates to an airbag deployment control system for use in a vehicle generally indicated as 10 including means to detect the position of the driver's seat generally indicated as 12 relative to the driver's side self restraint airbag system generally indicated as 14 and means to generate a control signal(s) to either permit or prevent deployment of the driver's side airbag 16 during a collision where the driver's side airbag 16 is normally stored in the steering wheel generally indicated as 18 or other suitable storage location when the distance between the driver's backrest 20 and the driver's side self restraint airbag system 14 is less than a predetermined distance and to detect the position of the front passenger's seat generally indicated as 22 relative to the front passenger's side self restraint airbag system generally indicated as 24 and means to generate a control signal(s) to either permit or prevent the deployment of the front passenger's side airbag 26 during a collision where the front passenger's side airbag 26 is normally stored in the dashboard generally indicated as 28 or other suitable location when the distance between the front passenger's backrest 30 and the front passenger's side self restraint airbag system 24 is less than a predetermined distance.

Figure 2:
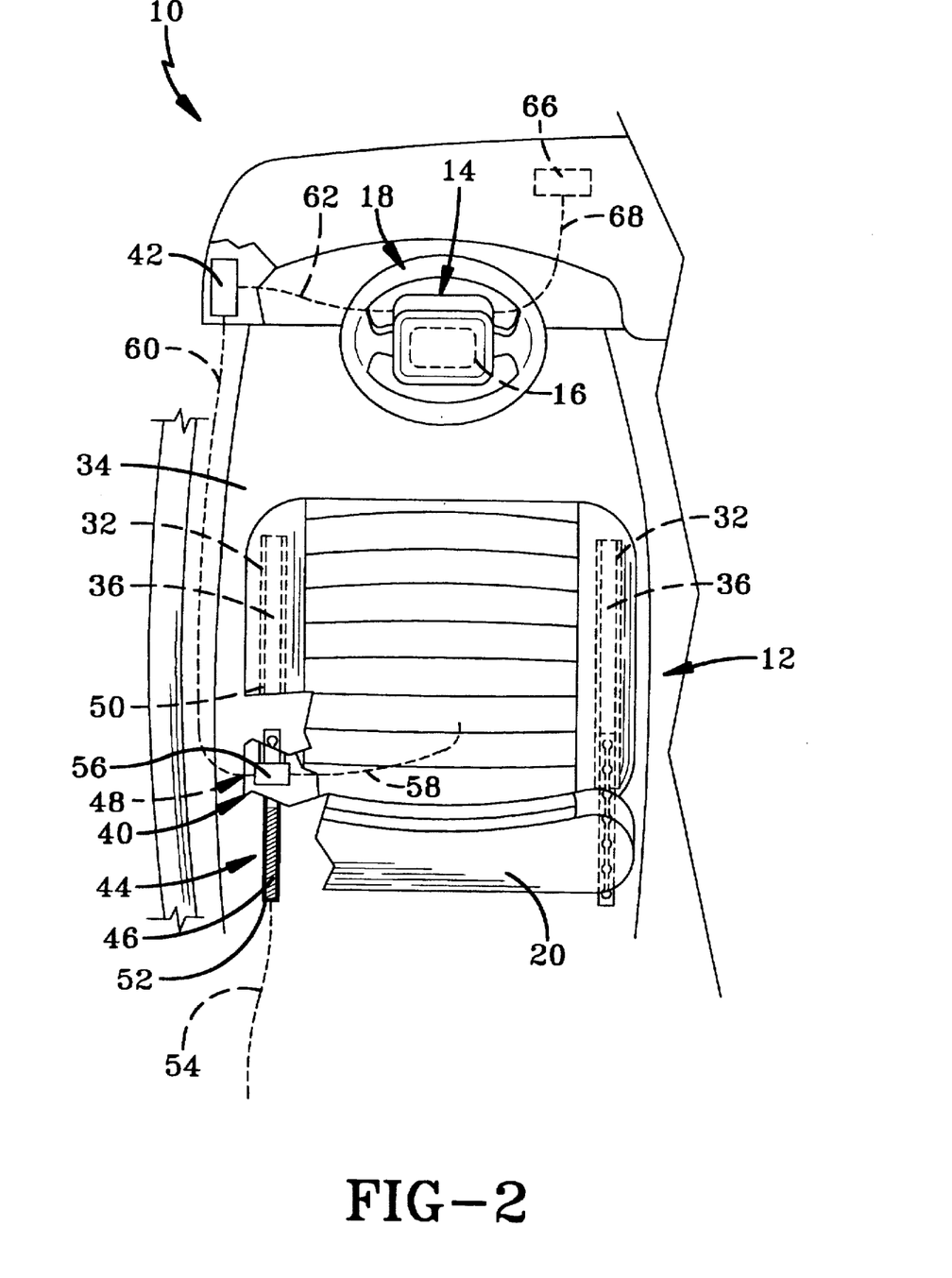
FIG. 2 is a top view of the airbag deployment control system of the present invention on the driver's side with a single inflator.
Figure 3:
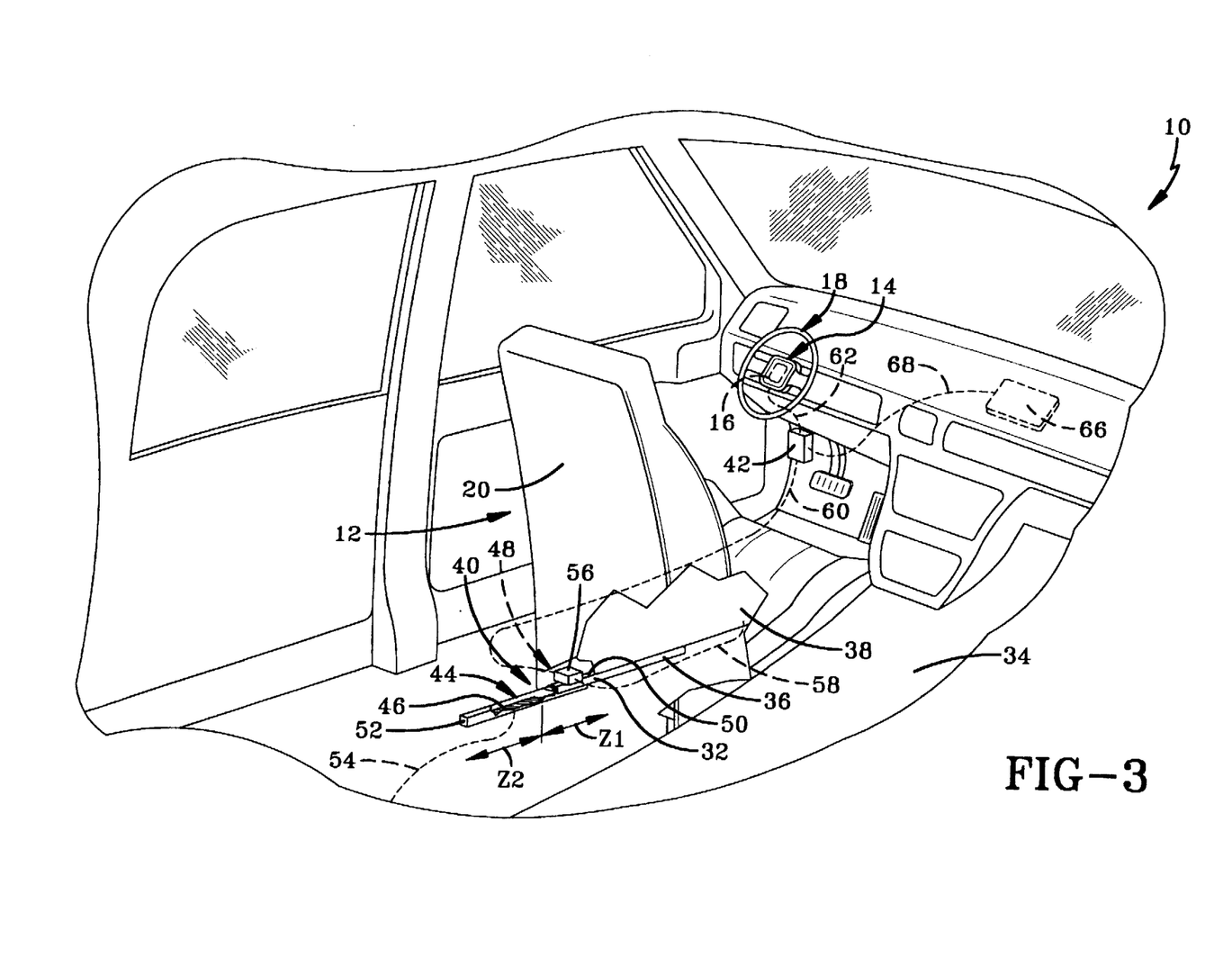
FIG. 3 is a perspective view of the airbag deployment control system of the present invention on the driver's side with a single inflator as shown in FIG. 2.

As shown in FIGS. 2 and 3, the driver's seat 12 is slidably mounted on a pair of substantially parallel guide tracks each indicated as 32 affixed to the floor 34 of the vehicle 10 by a corresponding pair of substantially parallel support rails each indicated as 36 attached to the lower portion or bottom 38 of the driver's seat 12 such that the driver's seat 12 is movable relative to the driver's side self restraint airbag system 14 to accommodate drivers of different statures.

As shown in FIGS. 2 and 3, the airbag deployment control system comprises a switch or sensor means generally indicated as 40 operatively coupled to the driver's side self restraint airbag system 14 through a control means 42 to detect the position of the driver's seat 12 relative to the driver's side self restraint airbag system 14 and to generate a seat position indicator signal when the distance therebetween is equal to or greater than a predetermined distance D1 to permit deployment of the driver's side airbag 16 during a collision of the vehicle 10.

As shown in FIGS. 2 and 3, the switch or sensor means 40 comprises a first switch or sensor element generally indicated as 44 operatively coupled to the rear portion 46 on at least one of the guide tracks 32 and a second switch or sensor element generally indicated as 48 attached to the rear portion 50 of the corresponding support rail 36 such that when the driver's seat 12 is moved along the guide tracks 32 the second switch or sensor element 48 is moved relative to the first switch or sensor element 44.

The first switch or sensor element 44 comprises a magnetic strip 52 or similar device connected to a power source or ground (not shown) by a conductor 54; while, the second switch or sensor element 48 comprises a reed member 56 or similar device connected to a power source or ground (not shown) by a conductor 58 such that when the second switch or sensor element 48 is moved into operative relationship relative to the first switch or sensor element 44, the switch or sensor means 40 generates a seat position indicator signal fed to the control means 42 through a conductor 60.

As previously set forth, the first switch or sensor element 44 is located on the rear portion 46 of at least one of the guide tracks 32 such that when the distance between the driver's side self restraint airbag system 14 and the driver's backrest 20 is less than the predetermined distance D1, the second switch or sensor element 48 is disposed in region Z1 and not operatively disposed relative to the first switch or sensor 44 generating no seat position indicator signal and when the distance between the driver's side self restraint airbag system 14 and the driver's backrest 20 is equal to or greater than the predetermined distance D1, the second switch or sensor element 48 is disposed in region Z2 and operatively disposed or aligned relative to the first switch or sensor 44 to generate the seat position indicator signal that is fed to the control means 42.

The control means 42 comprises circuitry including means to receive the seat position indicator signal generated by the switch or sensor means 40 when the distance between the driver's side self restraint airbag system 14 and the driver's backrest is equal to or greater than D1 and to generate a control enable signal fed to the driver's side self restraint airbag system 14 through a conductor 62 to permit deployment of the driver's side airbag 16 as described more fully hereinafter.

The front passenger's side may be similarly equipped with an airbag deployment control system to permit deployment of the front passenger's side airbag 26 relative to distance D2.

Figure 4:
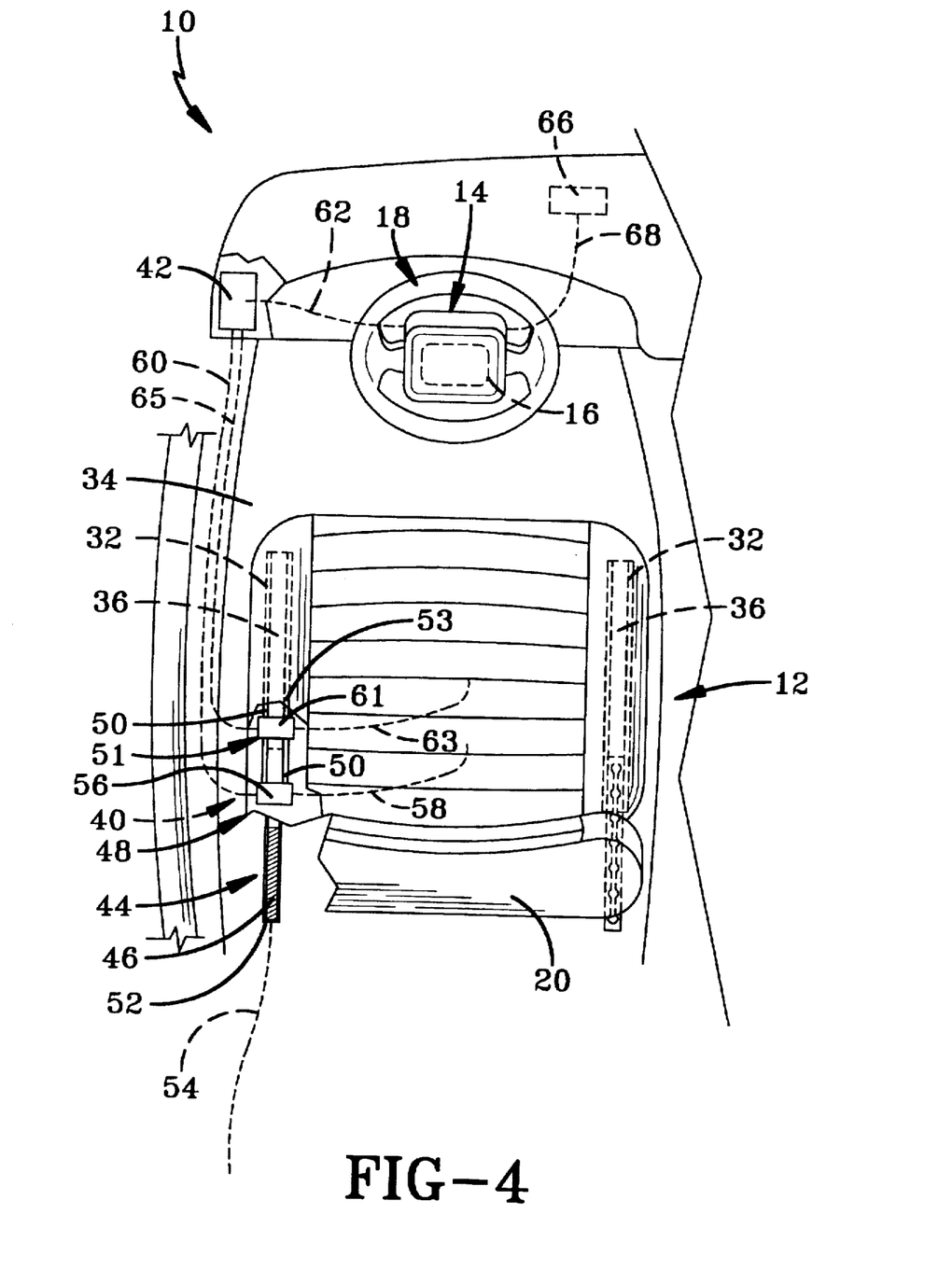
FIG. 4 is a top view of the airbag deployment control system of the present invention on the driver's side with a dual inflator.
Figure 5:
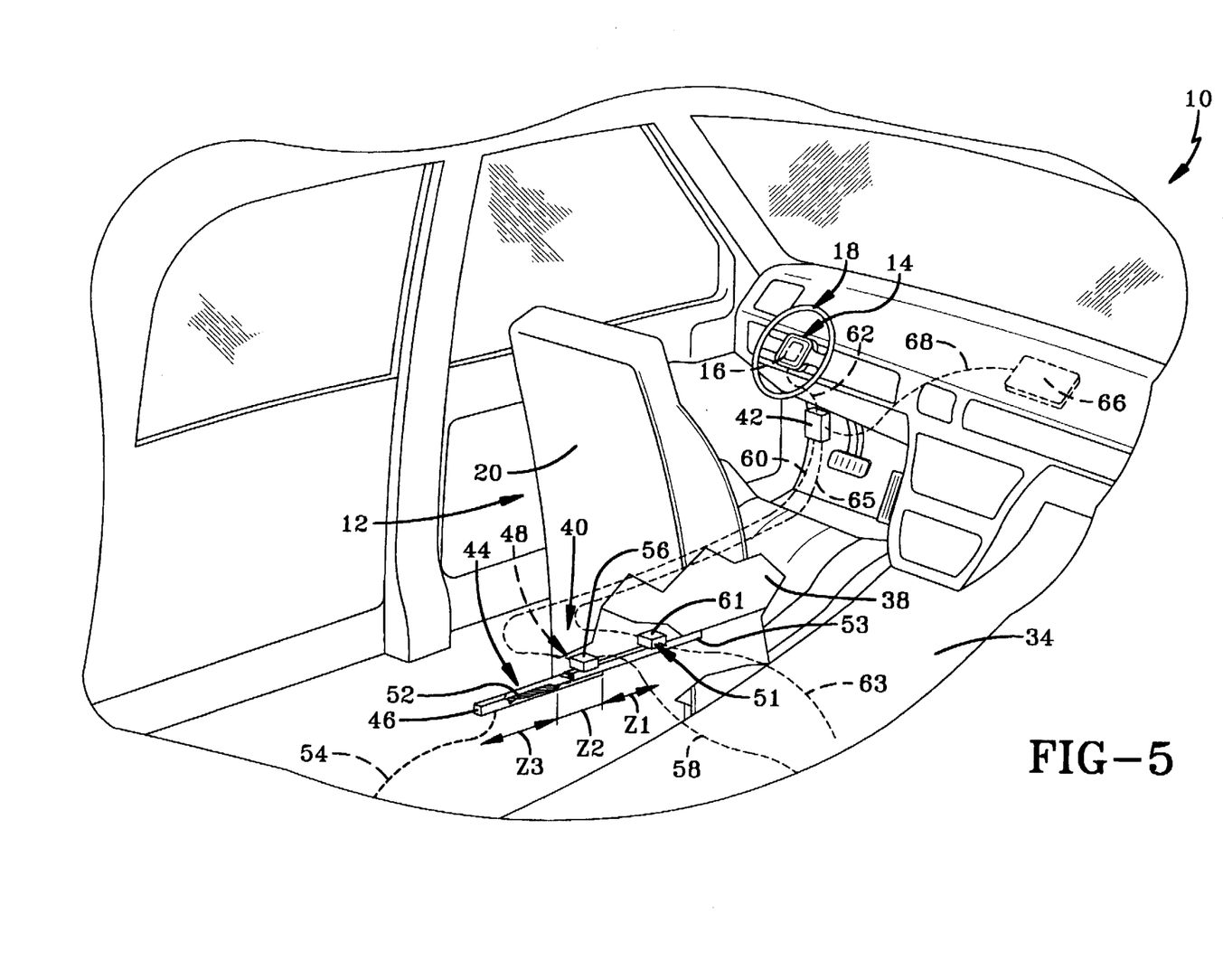
FIG. 5 is a perspective view of the airbag deployment control system of the present invention on the driver's side with a dual inflator as shown in FIG. 4.

FIGS. 4 and 5 show an alternate embodiment of the present invention similar to that of the airbag deployment control system shown in FIGS. 2 and 3 for use with a dual inflator. Specifically, the driver's seat 12 is slidably mounted on a pair of substantially parallel guide tracks each indicated as 32 affixed to the floor 34 of the vehicle 10 by a corresponding pair of substantially parallel support rails each indicated as 36 attached to the lower portion or bottom 38 of the driver's seat 12 such that the driver's seat 12 is adjustable relative to the driver's side self restraint airbag system 14 to accommodate drivers of different statures.

As shown in FIGS. 4 and 5, the airbag deployment control system comprises a switch or sensor means generally indicated as 40 operatively coupled to the driver's side self restraint airbag system 14 through a control means 42 to detect the position of the driver's seat 12 relative to the driver's side self restraint airbag system 14 and to generate a first seat position indicator signal when the distance therebetween is equal to or greater than a first predetermined distance D1 and less than a second predetermined distance D1' to permit partial deployment of the driver's side airbag 16 during a collision of the vehicle 10 and to generate a second seat position indicator signal when the distance between the driver's seat 12 and the driver's side self restraint airbag system 14 is equal to or greater than D1' to permit full deployment of the driver's side airbag 16 during a collision of the vehicle 10.

As shown in FIGS. 4 and 5, the switch or sensor means 40 comprises a first switch or sensor element generally indicated as 44 operatively coupled to the rear portion 46 on at least one of the guide tracks 32 and a second switch or sensor element generally indicated as 48 attached to the rear portion 50 of the corresponding support rail 36 and a third switch or sensor element generally indicated as 51 attached to the mid-portion 53 of the corresponding support rail 36 such that when the driver's seat 12 is moved along the guide tracks 32 the second switch or sensor element 48 and the third switch or sensor element 51 are moved relative to the first switch or sensor element 44.

The first switch or sensor element 44 comprises a magnetic strip 52 or similar device connected to a power source or ground (not shown) by a conductor 54; while, the second switch or sensor element 48 comprises a reed member 56 or similar device connected to a power source or ground (not shown) by a conductor 58 such that when the second switch or sensor element 48 is moved into operative relationship relative to the first switch or sensor element 44, the switch or sensor means 40 generates a first seat position indicator signal fed to the control means 42 through a conductor 60. The third switch or sensor element 51 comprises a reed member 61 or similar device connected to a power source or ground (not shown) by a conductor 63 such that when the third switch or sensor element 51 is moved into operative relationship relative to the first switch or sensor element 44 the switch or sensor means 40 generates a second seat position indicator signal fed to the control means 42 through a conductor 65.

As previously set forth, the first switch or sensor element 44 is located on the rear portion 50 of at least one of the guide tracks 32 such that when the distance between the driver's side self restraint airbag system 14 and the driver's backrest 20 is less than the predetermined distance D1, the second switch or sensor element 48 is disposed in Z1 and not operatively disposed relative to the first switch or sensor element 44 generating no seat position indicator signal. When the distance between the driver's side self restraint airbag system 14 and the driver's backrest 20 is equal to or greater than the first predetermined distance D1 but less than the second predetermined distance D1', the second switch or sensor element 48 is disposed in Z2 and operatively disposed or aligned relative to the first switch or sensor element 44 to generate the first seat position indicator signal that is fed to the control means 42. When the distance between the driver's side self restraint airbag system 14 and driver's backrest 20 is equal to or greater than second predetermined distance D1', the third switch or sensor element 51 is disposed in Z3 and operatively disposed or aligned relative to the first switch or sensor element 44 to generate the second seat position indicator signal that is fed to the control means 42.

The control means 42 comprises circuitry including means to receive the first seat position indicator signal generated by the switch or sensor means 40 when the distance between the driver's side self restraint airbag system 14 and the driver's backrest is equal to or greater than D1 but less than D1' and to generate a first control enable signal fed to the driver's side self restraint airbag system 14 through a conductor 62 to permit partial deployment of the driver's side airbag 16 as described more fully hereinafter. The control means 42 further comprises circuitry including means to receive the second seat position indicator signal generated by the switch or sensor means 40 when the distance between the driver's side self restraint airbag system 14 and the driver's backrest is equal to or greater than D1' and to generate a second control enable signal fed to the driver's side self restraint airbag system through the conductor 62 to permit full deployment of the driver's side airbag 16 as described more fully hereinafter.

The front passenger's side may be similarly equiped with an airbag deployment control system to permit deployment of the front passenger's side airbag 26 relative to distances D2 and D2'.

When installed, the driver's side airbag self restraint system 14 is operatively coupled to the airbag deployment control system by the conductor 62 to an accelerometer 66 by a conductor 68.

When the vehicle 10 is involved in a collision and the accelerometer 66 senses a deceleration greater than a predetermined threshold level, the accelerometer 66 sends an airbag actuation signal to the driver's side airbag restraint system 14.

The driver's side airbag 16 will deploy when the second switch or sensor element 48 is disposed in region Z2 in the single inflator configuration as shown in FIGS. 2 and 3, and partially or fully deploy when disposed in regions Z2 and Z3 respectively in the dual inflator configuration as shown in FIGS. 4 and 5.

Figure 6:
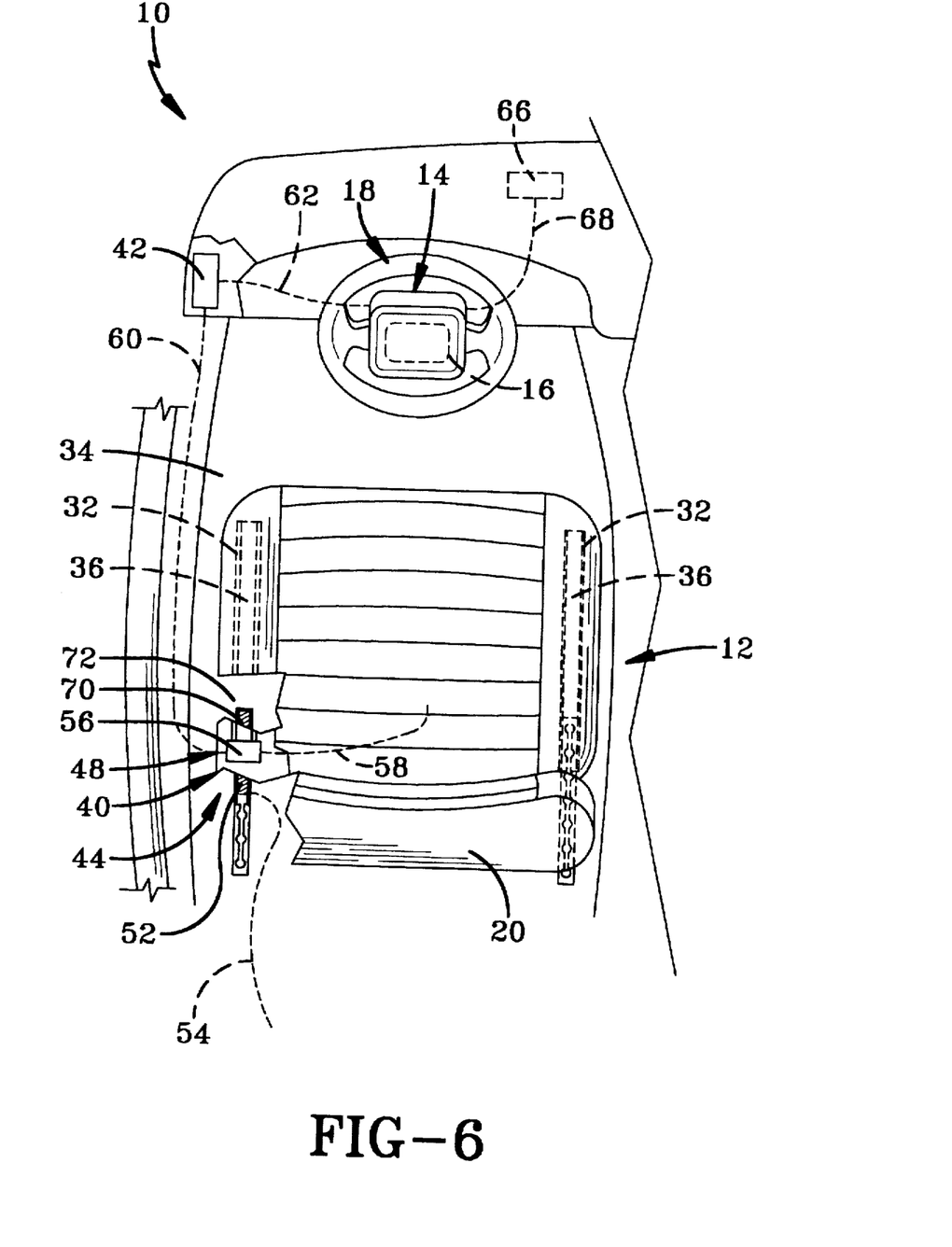
FIG. 6 is a top view of an alternate embodiment of the airbag deployment control system of the present invention on the driver's side with a single inflator.
Figure 7:
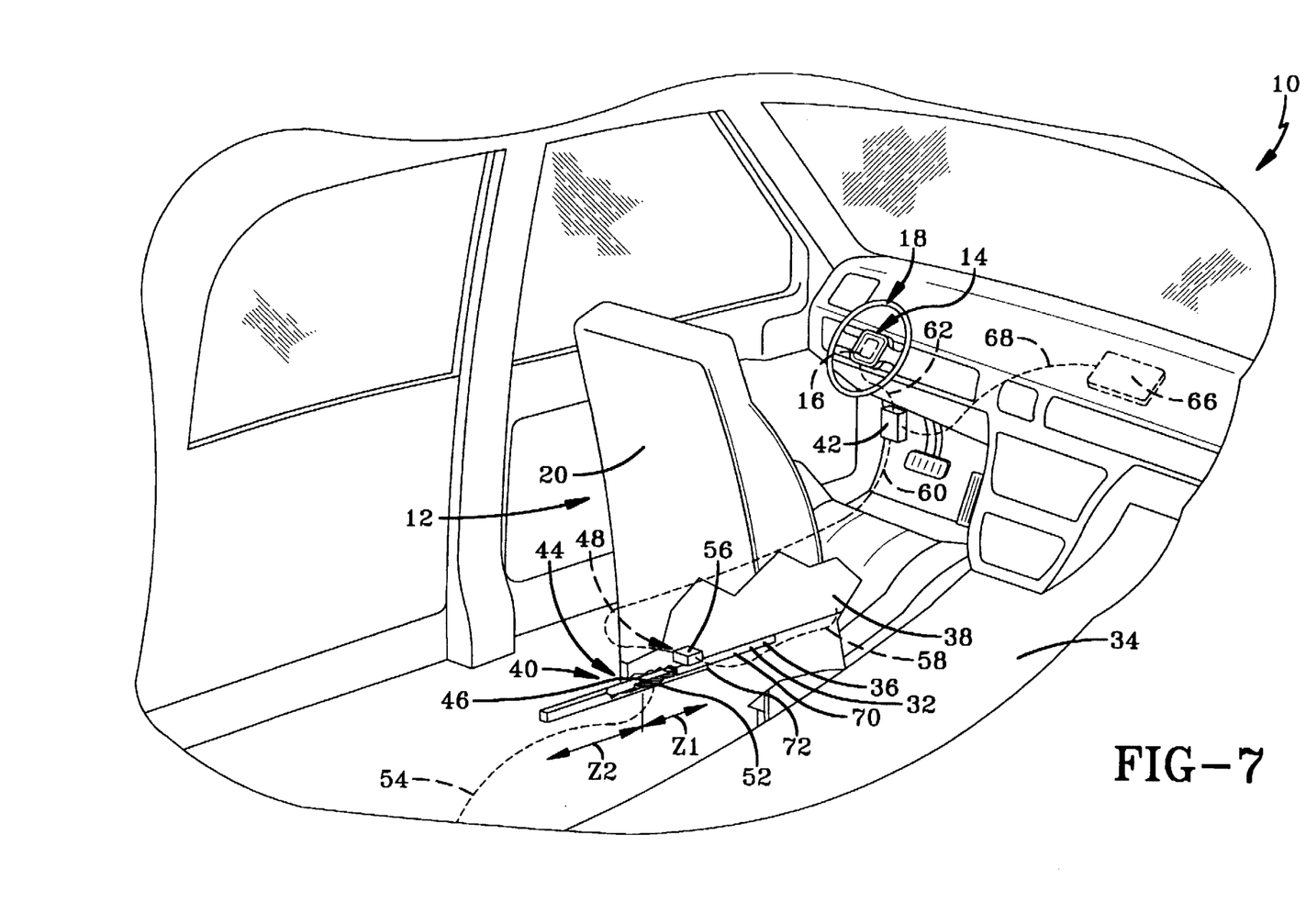
FIG. 7 is a perspective view of the alternate embodiment of the airbag deployment control system of the present invention on the driver's side with a single inflator as shown in FIG. 6.

FIGS. 6 and 7 shown an alternate embodiment for use with a single inflator. Specifically, the driver's seat 12 is slidably mounted on a pair of substantially parallel guide tracks each indicated as 32 affixed to the floor 34 of the vehicle 10 by a corresponding pair of substantially parallel support rails each indicated as 36 attached to the lower portion or bottom 38 of the driver's seat 12 such that the driver's seat 12 is movable relative to the driver's side self restraint airbag system 14 to accommodate drivers of different statures.

As shown in FIGS. 6 and 7, the airbag deployment control system comprises a switch or sensor means generally indicated as 40 operatively coupled to the driver's side self restraint airbag system 14 through a control means 42 to detect the position of the driver's seat 12 relative to the driver's side self restraint airbag system 14 and to generate a seat position indicator signal when the distance therebetween is equal to or greater than a predetermined distance D1 to permit deployment of the driver's side airbag 16 during a collision of the vehicle 10.

As shown in FIGS. 6 and 7, the switch or sensor means 40 comprises a first switch or sensor element generally indicated as 44 operatively coupled to the front portion 70 on at least one of the guide tracks 32 and a second switch or sensor element generally indicated as 48 attached to the front portion 72 of the corresponding support rail 36 such that when the driver's seat 12 is moved along the guide tracks 32 the second switch or sensor element 48 is moved relative to the first switch or sensor element 44.

The first switch or sensor element 44 comprises a magnetic strip 52 or similar device connected to a power source or ground (not shown) by a conductor 54; while, the second switch or sensor element 48 comprises a reed member 56 or similar device connected to a power source or ground (not shown) by a conductor 58 such that when the second switch or sensor element 48 is moved into operative relationship relative to the first switch or sensor element 44, the switch or sensor means 40 generates a seat position indicator signal fed to the control means 42 through a conductor 60.

As previously set forth, the first switch or sensor element 44 is located on the front portion 70 of at least one of the guide tracks 32 such that when the distance between the driver's side self restraint airbag system 14 and the driver's backrest 20 is less than the predetermined distance D1, the second switch or sensor element 48 is disposed in region Z1 and operatively disposed relative to the first switch or sensor 44 to generate a seat position indicator signal and when the distance between the driver's side self restraint airbag system 14 and the driver's backrest 20 is equal to or greater than the predetermined distance D1, the second switch or sensor element 48 is disposed in region Z2 and not operatively disposed or aligned relative to the first switch or sensor 44 and not generate the seat position indicator signal.

The control means 42 comprises circuitry including means to receive the seat position indicator signal generated by the switch or sensor means 40 and to generate a control disable signal fed to the driver's side self restraint airbag system 14 through a conductor 62 to present deployment of the driver's side airbag 16 as described more fully hereinafter.

The front passenger's side may be similarly equipped with an airbag deployment control system to permit deployment of the front passenger's side airbag 26 relative to distance D2.

Figure 8:
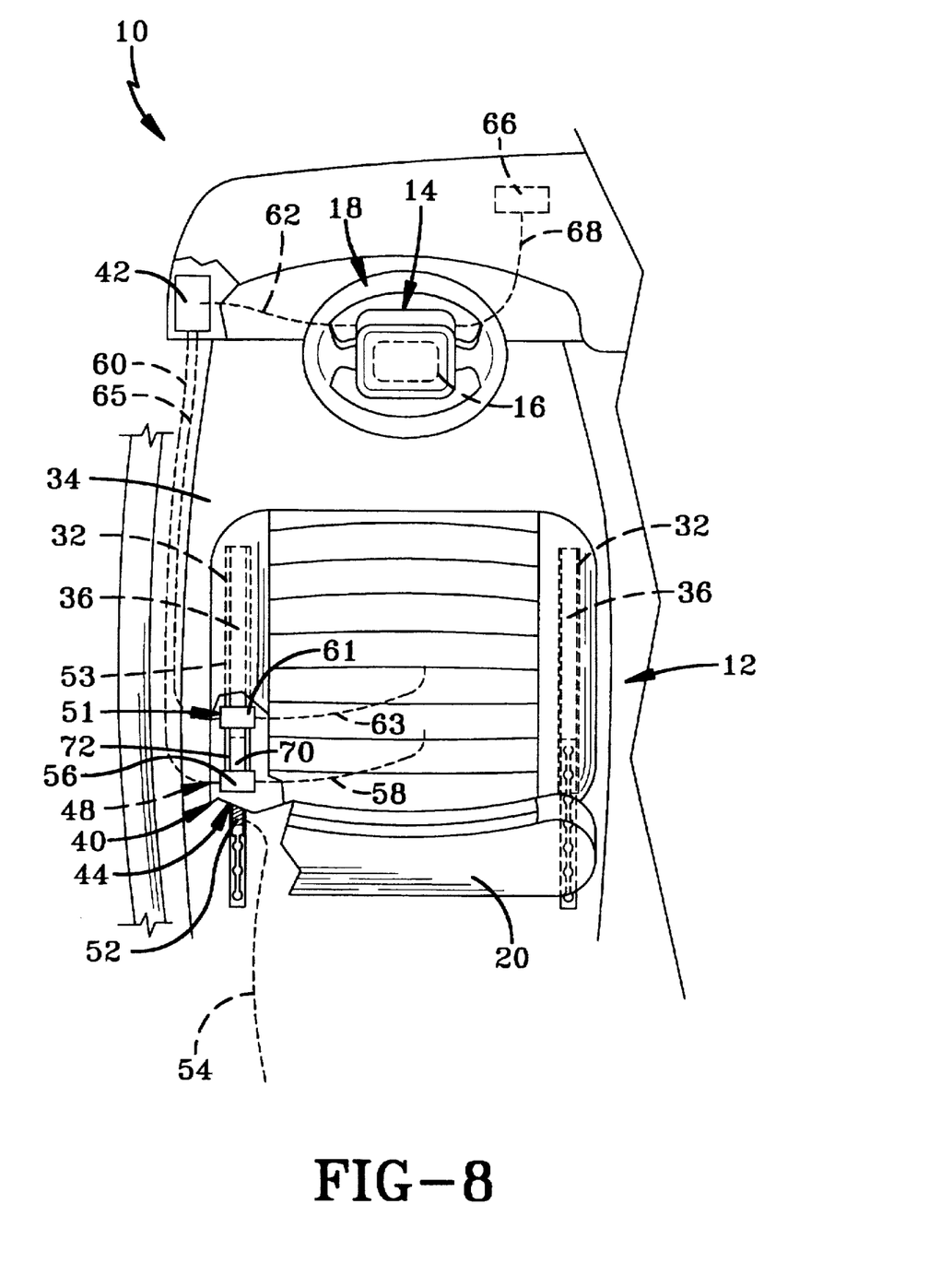
FIG. 8 is a top view of another alternate embodiment of the airbag deployment control system of the present invention on the driver's side with a dual inflator.
Figure 9:
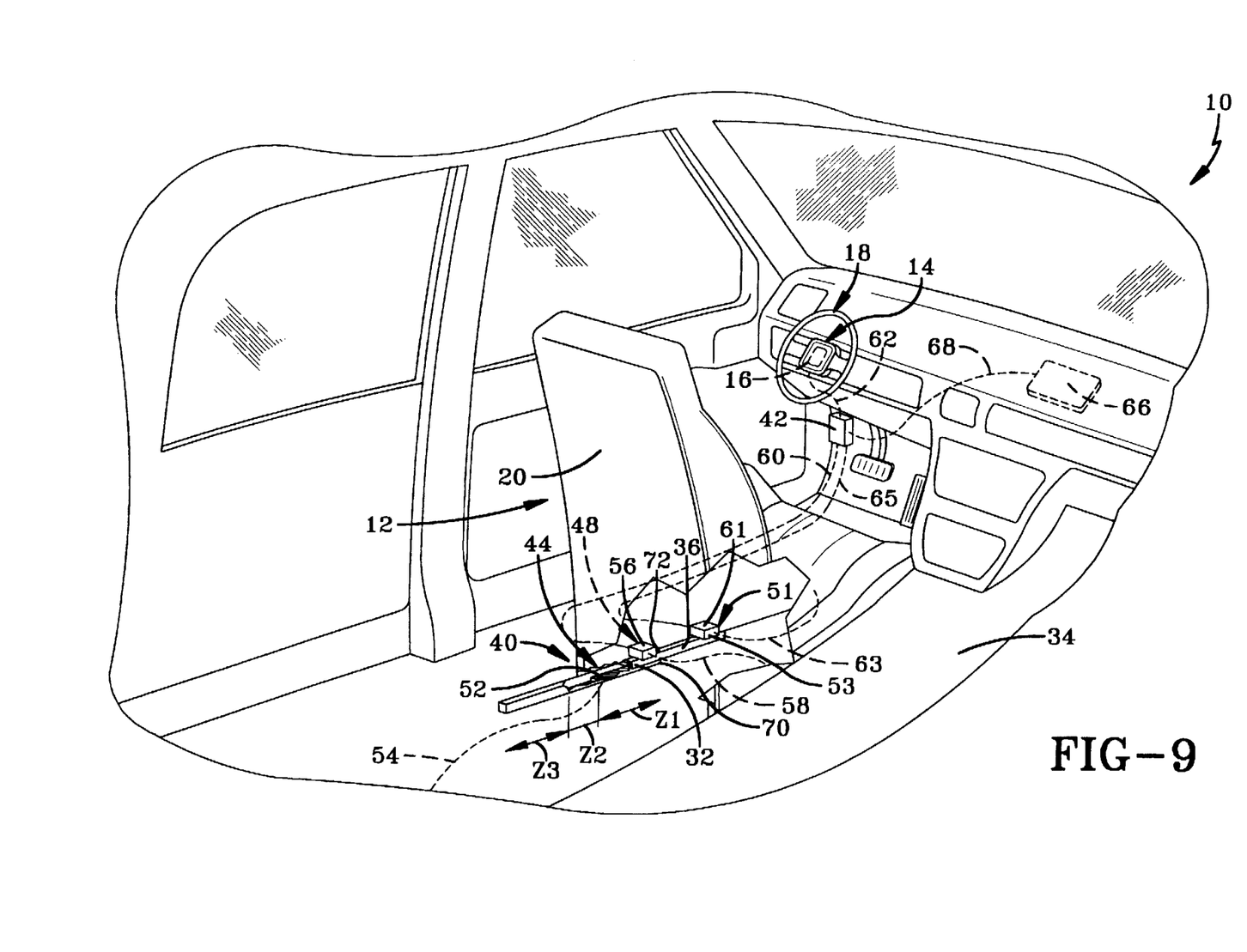
FIG. 9 is a perspective view of the alternate embodiment of the airbag deployment control system of the present invention on the driver's side with a dual inflator as shown in FIG. 8.

FIGS. 8 and 9 show an alternate embodiment of the present invention similar to that of the airbag deployment control system shown in FIGS. 6 and 7 for use with a dual inflator. Specifically, the driver's seat 12 is slidably mounted on a pair of substantially parallel guide tracks each indicated as 32 affixed to the floor 34 of the vehicle 10 by a corresponding pair of substantially parallel support rails each indicated as 36 attached to the lower portion or bottom 38 of the driver's seat 12 such that the driver's seat 12 is adjustable relative to the driver's side self restraint airbag system 14 to accommodate drivers of different statures.

As shown in FIGS. 8 and 9, the airbag deployment control system comprises a switch or sensor means generally indicated as 40 operatively coupled to the driver's side self restraint airbag system 14 through a control means 42 to detect the position of the driver's seat 12 relative to the driver's side self restraint airbag system 14 and to generate a first seat position indicator signal when the distance therebetween is less than a first predetermined distance D1 to prevent deployment of the driver's side airbag 16 during a collision of the vehicle 10 to generate a second seat position indicator signal when the distance between the driver's seat 12 and the driver's side self restraint airbag system 14 is equal to or greater than D1 and less than D1' to permit partial deployment of the driver's side airbag 16 and to generate a signal to prevent full deployment during a collision of the vehicle 10.

As shown in FIGS. 8 and 9, the switch or sensor means 40 comprises a first switch or sensor element generally indicated as 44 operatively coupled to the front portion 70 on at least one of the guide tracks 32 and a second Switch or sensor element generally indicated as 48 attached to the front portion 72 of the corresponding support rail 36 and a third switch or sensor element generally indicated as 51 attached to the mid-portion 53 of the corresponding support rail 36 such that when the driver's seat 12 is adjusted on the guide tracks 32 the second switch or sensor element 48 and the third switch or sensor element 51 are moved relative to the first switch or sensor element 44.

The first switch or sensor element 44 comprises a magnetic strip 52 or similar device connected to a power source or ground (not shown) by a conductor 54; while, the second switch or sensor element 48 comprises a reed member 56 or similar device connected to a power source or ground (not shown) by a conductor 58 such that when the second switch or sensor element 48 is moved into operative relationship relative to the first switch or sensor element 44, the switch or sensor means 40 generates a first seat position indicator signal fed to the control means 42 through a conductor 60.

The third switch or sensor element 51 comprises a reed member 61 or similar device connected to a power source or ground (not shown) by a conductor 63 such that when the third switch or sensor element 51 is moved into operative relationship relative to the first switch or sensor element 44 the switch or sensor means 40 generates a second seat position indicator signal fed to the control means 42 through a conductor 65.

As previously set forth, the first switch or sensor element 44 is located on the front portion 70 of at least one of the guide tracks 32 such that when the distance between the driver's side self restraint airbag system 14 and the driver's backrest 20 is less than the first predetermined distance D1, the second switch or sensor element 48 is disposed in Z1 and operatively disposed relative to the first switch or sensor element 44 to generate the first seat position indicator signal. When the distance between the driver's side self restraint airbag system 14 and the driver's backrest 20 is equal to or greater than the first predetermined distance D1 but less than the second predetermined distance D1', the second switch or sensor element 48 is disposed in Z2 and not operatively disposed or aligned relative to the first switch or sensor element 44 to generate the second seat position indicator signal that is fed to the control means 42. When the distance between the driver's side self restraint airbag system 14 and driver's backrest 20 is equal to or greater than second predetermined distance D1', the third switch or sensor element 51 is disposed in Z3 and not operatively disposed or aligned relative to the first switch or sensor element 44 such that no disable signal is generated.

The control means 42 comprises circuitry including means to receive the first seat position indicator signal generated by the switch or sensor means 40 when the distance between the driver's side self restraint airbag system 14 and the driver's backrest 20 is less than D1 and to generate a first control disable signal fed to the driver's side self restraint airbag system 14 through a conductor 62 to prevent deployment of the driver's side airbag 16 as described more fully hereinafter. The control means 42 further comprises circuitry including means to receive the second seat position indicator signal generated by the switch or sensor means 40 when the distance between the driver's side self restraint airbag system 14 and the driver's backrest is equal to or greater than D1 and less than D1' and to generate a second control disable signal fed to the driver's side self restraint airbag system through the conductor 62 to permit partial deployment of the driver's side airbag 16 as described more fully hereinafter.

When installed, the driver's side airbag self restraint system 14 with the dual inflator airbag is operatively coupled to the airbag deployment control system by the conductor 62 to an accelerometer 66 by a conductor 68.

When the vehicle 10 is involved in a collision and the accelerometer 66 senses a deceleration greater than a predetermined threshold level, the accelerometer 66 sends an airbag actuation signal to the driver's side airbag restraint system 14.

The driver's side airbag 16 will not deploy when the second switch or sensor element 48 is disposed in region Z1, partially deploy when disposed in regions Z2 and fully deploy when in region Z3 in the dual inflator configuration as shown in figs. 8 and 9.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An airbag deployment control system for use in a vehicle to selectively control the deployment of an airbag protection system in the front seat compartment of a vehicle comprising:

(a) a switch means to detect the position of a seat within the front seat compartment of the vehicle including means to generate a seat position indicator signal when the distance between the airbag protection system and a seat is equal to or greater than a predetermined distances; and (b) a control means including means to receive said seat position indicator signal from said switch means and to generate a control enable signal fed to the airbag protection system to enable deployment of the airbag when the vehicle is involved in a collision resulting in a deceleration greater than a predetermined threshold level, the seat being slidably mounted on a pair of substantially parallel guide tracks affixed to the floor of the vehicle by a corresponding pair of substantially parallel support rails each attached to the lower portion or bottom of the seat such that the seat is movable relative to the airbag protection system and said switch means comprises a magnet operatively coupled to one of the guide tracks and a reed member attached to the corresponding support rail such that when the seat is moved along the guide tracks said reed member is moved relative to said magnet and said switch member generates said seat position indicator signal fed to said control means.

2. The airbag deployment control system of claim 3 wherein the airbag protection system comprises a single airbag inflator.

3. The airbag deployment control system of claim 2 wherein the magnet is operatively coupled to the rear portion the guide track and the reed member is attached to the rear portion of the corresponding support rail.

4. The airbag deployment control system of claim 1 wherein the magnet is operatively coupled to the rear portion the guide track and the reed member is attached to the rear portion of the corresponding support rail.

5. An airbag deployment control system for use in a vehicle to selectively control the deployment of an airbag protection system for selective deployment in the front seat compartment of the vehicle in either a partial deployment configuration or a full deployment configuration comprising:

(a) a switch means to detect the position of a seat within the front seat compartment of the vehicle including means to generate a first seat position indicator signal when the distance between the airbag protection system and the seat is equal to or greater than a first predetermined distance and less than a second predetermined distance and to generate a second seat position indicator signal when the distance between the seat and the airbag protection system is equal to or greater than said second predetermined distance; and (b) a control means including means to receive said first seat position indicator signal generated by said switch means and to generate a first control enable switch signal fed to the airbag protection system to enable partial deployment of an airbag when the vehicle is involved in a collision resulting in a deceleration greater than a predetermined threshold level and to receive said second seat position indicator signal generated by said switch means and to generate a second control enable switch signal fed to the airbag protection system to enable full deployment of the airbag when the vehicle is involved in a collision resulting in a deceleration greater than the predetermined threshold level, the seat being slidably mounted on a pair of substantially parallel guide tracks affixed to the floor of the vehicle by a corresponding pair of substantially parallel support rails each attached to the lower portion or bottom of the seat such that the seat is movable relative to the airbag protection system, and said switch means comprises a magnet operatively coupled to one of the guide tracks, a first reed member attached to the corresponding support rail and a second reed member attached to the corresponding support rail such that when the seat is moved along the guide tracks said first reed member and said second reed member are moved relative to said magnet, when said first reed member is moved into operative relationship relative to said magnet said switch means generates said first seat position indicator signal fed to said control means and when said second reed member is moved into operative relationship relative to said magnet said switch means generates said second seat position indicator signal fed to said control means.

6. The airbag deployment control system of claim 5 wherein the airbag protection system comprises dual airbag inflators.

7. The airbag deployment control system of claim 6 wherein the magnet is operatively coupled to the rear portion of the guide track, the first reed member is attached to the rear portion of the corresponding support rail and the second reed member is attached to the mid-portion of the corresponding support rail.

8. The airbag deployment control system of claim 5 wherein the magnet is operatively coupled to the rear portion of the guide track, the first reed member is attached to the rear portion of the corresponding support rail and the second reed member is attached to the mid-portion of the corresponding support rail.

9. An airbag deployment control system for use in a vehicle to selectively control the deployment of an airbag protection system for deployment in the front seat compartment of the vehicle comprising a switch means to detect the position of a seat within the front seat compartment of the vehicle comprising:

(a) means to generate a seat position indicator signal when the distance between the airbag protection system and the seat is less than a predetermined distanced; and (b) a control means including means to receive said seat position indicator signal from said switch means and to generate a control disable signal fed to the airbag protection system to prevent deployment of an airbag when the vehicle is involved in a collision resulting in a deceleration greater than a predetermined threshold level, said seat being slidably mounted on a pair of substantially parallel guide tracks affixed to the floor of the vehicle by a corresponding pair of substantially parallel support rails each attached to the lower portion or bottom of the seat such that the seat is movable relative to the airbag protection system and said switch means comprises a magnet operatively coupled to one of the guide tracks and a reed member attached to the corresponding support rail such that when the seat is moved along the guide tracks said reed member is moved relative to said magnet such that when said reed member is moved into operative relationship relative to said magnet said switch means generates said seat position indicator signal fed to said control means.

10. The airbag deployment control system of claim 9 wherein the airbag protection system comprises a single airbag inflator.

11. The airbag deployment control system of claim 10 wherein the magnet is operatively coupled to the rear portion the guide track and the reed member is attached to the rear portion of the corresponding support rail.

12. The airbag deployment control system of claim 9 wherein the magnet is operatively coupled to the rear portion the guide track and the reed member is attached to the rear portion of the corresponding support rail.

13. An-airbag deployment control system for use in a vehicle to selectively control the deployment of an airbag protection system for selective deployment in the front seat compartment of the vehicle in either a partial deployment configuration or a full deployment configuration comprising a switch means to detect the position of a seat within the front seat compartment of the vehicle comprising:

(b) means to generate a first seat position indicator signal when the distance between the airbag protection system and the seat is less than a first predetermined distance and to generate a second seat position indicator signal when the distance between the seat and the airbag protection system is equal to or greater than said first predetermined distance and less than a second predetermined distances; and (b) a control means including means to receive said first seat position indicator signal generated by said switch means and to generate a first control disable switch signal fed to the airbag protection system to fully disable deployment of an airbag when the vehicle is involved in a collision resulting in a deceleration greater than a predetermined threshold level and to receive said second seat position indicator signal generated by the switch means and to generate a second control disable switch signal fed to the airbag protection system to partially disable deployment of the airbag when the vehicle is involved in a collision resulting in a deceleration greater than said predetermined threshold level, the seat being slidably mounted on a pair of substantially parallel guide tracks affixed to the floor of the vehicle by a corresponding pair of substantially parallel support rails each attached to the lower portion or bottom of the seat such that the seat is movable relative to the airbag protection system and said switch means comprises a magnet operatively coupled to one of the guide tracks, a first reed member attached to the corresponding support rail and a second reed member attached to the corresponding support rail such that when the seat is moved alone the guide tracks said first reed member and said second reed member are moved relative to said first switch element, such that when said first reed member is moved into operative relationship relative to said magnet said switch means generates said first seat position indicator signal fed to said control means and when said second reed member is moved into operative relationship relative to said magnet said switch means generates said second seat position indicator signal fed to said control means.

14. The airbag deployment control system of claim 13 wherein the airbag protection system comprises dual airbag inflators.

15. The airbag deployment control system of claim 14 wherein the magnet is operatively coupled to the rear portion of the guide track, the first reed member is attached to the rear portion of the corresponding support rail and the second reed member is attached to the mid-portion of the corresponding support rail.

16. The airbag deployment control system of claim 13 wherein the magnet is operatively coupled to the rear portion of the guide track, the first reed member is attached to the rear portion of the corresponding support rail and the second reed member is attached to the mid-portion of the corresponding support rail.

* * * * *